Figure 1:
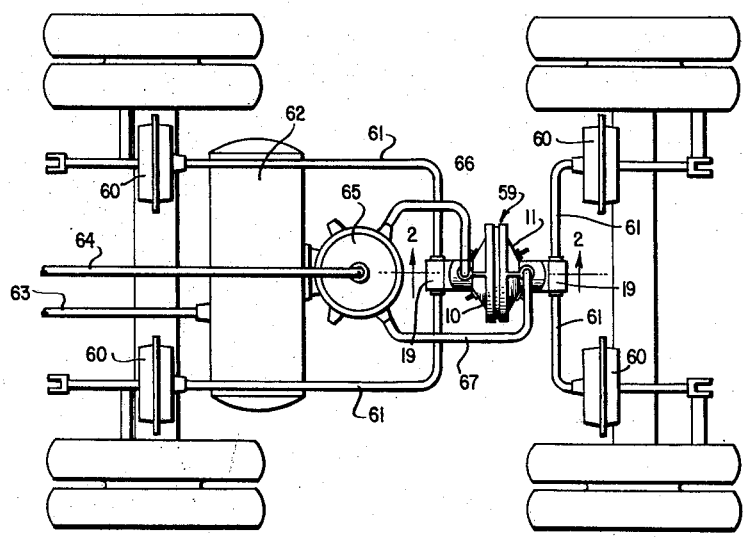

Sept. 8, 1964  W. ENGELS ETAL  3,148,364
SAFETY VALVE DEVICE FOR FLUID PRESSURE OPERATED BRAKE SYSTEMS
Filed Sept. 19, 1962  2 Sheets-Sheet 1

INVENTORS.
WALTER ENGELS
COY V. JONES, SR.
BY
*B. P. Fisheleman, Jr.*
ATTORNEY

Sept. 8, 1964  W. ENGELS ETAL  3,148,364
SAFETY VALVE DEVICE FOR FLUID PRESSURE OPERATED BRAKE SYSTEMS
Filed Sept. 19, 1962  2 Sheets-Sheet 2

INVENTORS.
WALTER ENGELS
COY V. JONES, SR.
BY B. P. Fishburne, Jr.
ATTORNEY

United States Patent Office 3,148,364
Patented Sept. 8, 1964

3,148,364
SAFETY VALVE DEVICE FOR FLUID PRESSURE OPERATED BRAKE SYSTEMS
Walter Engels, Tryon, N.C., and Coy V. Jones, Sr., Greer, S.C., assignors to Southern Machinery Company, Greer, S.C., a corporation of South Carolina
Filed Sept. 19, 1962, Ser. No. 224,790
8 Claims. (Cl. 340—242)

This invention relates to safety valve means for fluid brake systems such as the air brake systems of transport trucks and the like.

Numerous prior art valve devices for this general purpose have been devised but none has been completely satisfactory in commercial usage and particularly from the standpoint of economy and practically of manufacturing. In at least one such prior art proposal, the safety valve means has been refined to compensate for unequal adjustment of the brake linkage extending from the fluid pressure responsive brake actuators to the respective sets of brake shoes. Notwithstanding this and numerous other refinements proposed by the prior art, no completely satisfactory safety valve means has yet been devised and widely adapted for use on trucks and like vehicles, and an urgent need for such means clearly exists.

Generally speaking, the existing and known prior art devices for this purpose are either oversensitive in operation or not sensitive enough, requiring frequent delicate adjusting. Additionally, the prior art structures are far too complicated and therefore too costly to manufacture, and they are not sufficiently sturdy and durable to withstand the constant rough usage encountered in truck installations or the like. The prior art is also lacking in simplicity and compactness of design of these devices. In short, no completely practical safety valve device for fluid braking systems of the type being considered has yet been devised, and it is therefore the primary object of this invention to provide such a device.

Another and more specific object is to provide a safety valve device of the mentioned character having a built-in time delay feature which enables the device to respond only to an actual leakage in the fluid brake system instead of responding to a fictitious pressure leak which is in fact not a leak at all but only a symptom resembling a leak caused by unequal brake linkage adjustment.

Another object is to provide in a device of the mentioned character a built-in vacuum assist feature for the diaphragm valve shifting means, enabling the latter to operate with high sensitivity responsive to a true brake system leak, notwithstanding the aforementioned time delay or retarding means of the safety valve device.

Another object is to provide a device of the mentioned character having a greatly simplified and more reliable telltale signal light system and circuit closing means therefor.

A general object is to provide a safety valve device for fluid brake systems having simplicity of design, economy of manufacture and reliability and efficiency of operation, and requiring no adjusting and little or no maintenance subsequent to assembly and installation.

Other objects and advantages of the invention will be apparent during the course of the following detailed description.

Figure 2:
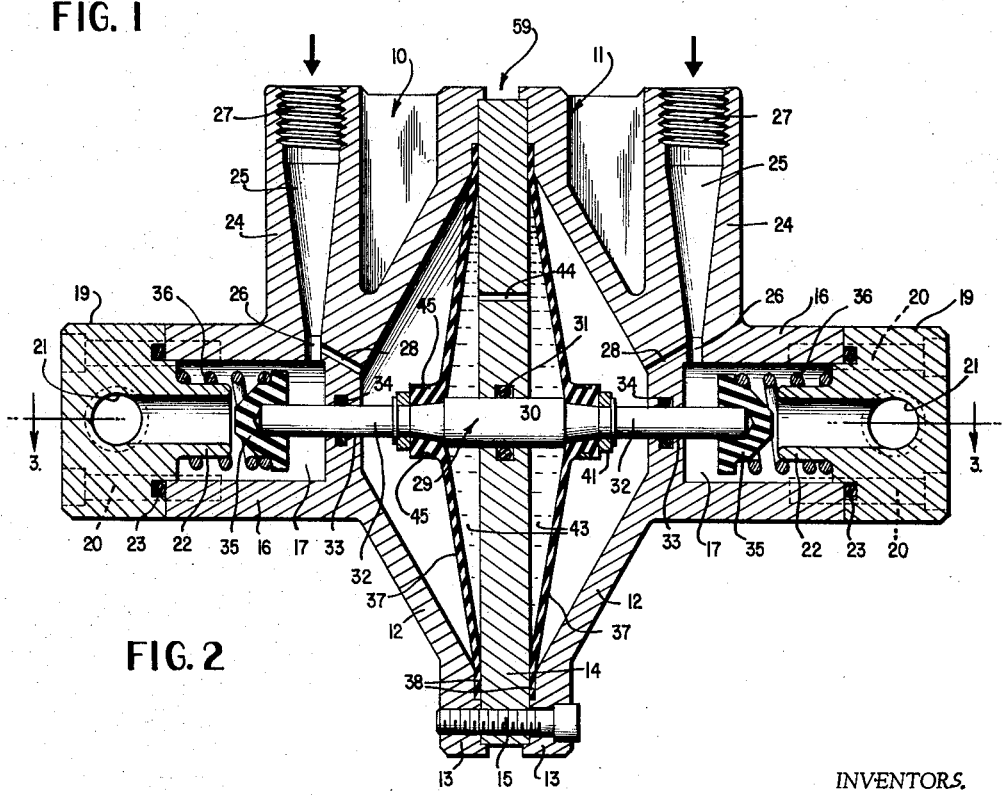
Figure 3:
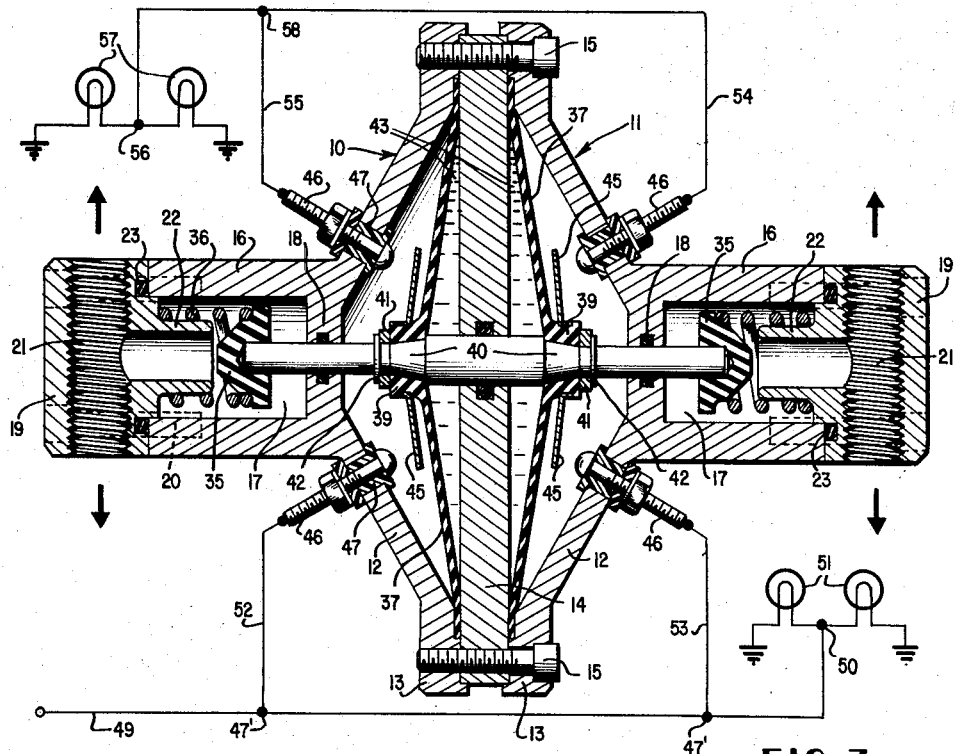
Figure 4:
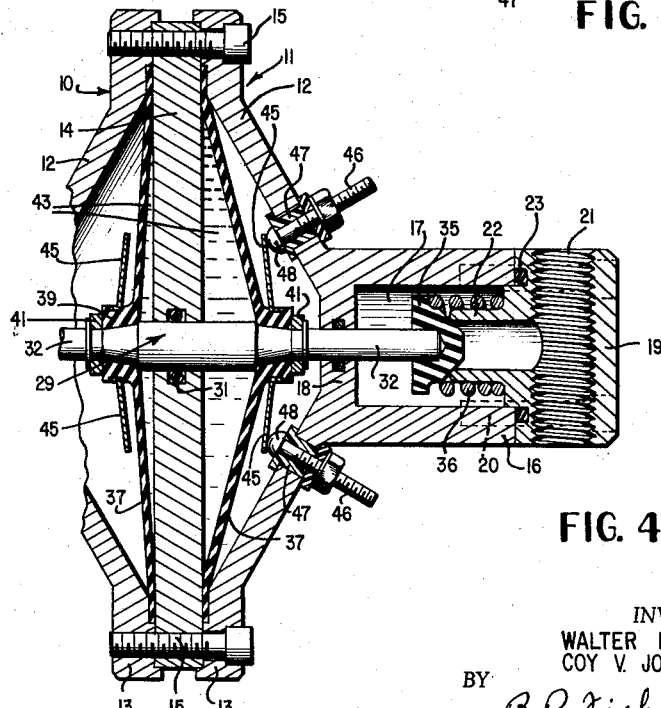

In the accompanying drawings forming a part of this application and in which like numerals are employed to designate like parts throughout the same, FIGURE 1 is a diagrammatic plan view of a largely conventional fluid brake system equipped with the safety valve device according to the invention, FIGURE 2 is an enlarged central vertical section through the safety valve device with the latter in a neutral position, taken on line 2—2 of FIGURE 1, FIGURE 3 is a horizontal central cross section taken on line 3—3 of FIGURE 2, and showing schematically the electrical circuit for the safety valve warning lights and the stop lights of the truck or like vehicle, and FIGURE 4 is a fragmentary section similar to FIGURE 3 showing the valve device in one closed or unbalanced condition, responsive to a leak in the braking system.

In the drawings, wherein for the purpose of illustration is shown a preferred embodiment of the invention, the numerals 10 and 11 designate generally a pair of identical separately formed opposed companion housing sections, including conically tapered body portions or walls 12 having peripheral attachment flanges 13 formed integral therewith. Disposed between the flanges 13 in abutting relation therewith is a substantial, flat separator plate 14, rigidly secured to the flanges 13 by suitable screws 15, as shown.

Each housing section 10 and 11 has an integral axial chamber extension 16 formed thereon, having a bore or chamber 17 therein, closed at its inner end by a wall 18 which is substantially a continuation of the adjacent body portion 12. Combined valve seat and outlet heads 19 cover the outer ends of chamber extensions 16, and are secured rigidly and detachably thereto by screws 20, shown in broken lines in the drawings. Each head 19 has a transverse screw-threaded through bore 21 defining a pair of outlet passages for the braking system air or fluid, and adapted to receive suitable screw-threaded fittings connected with the adjacent fluid lines running to the wheel brake actuators. Each head 19 has an integral tubular extension 22 extending from the inner side thereof into the adjacent chamber 17 and forming therein a valve seat for a valve element to be described. The heads 19 are preferably sealed where they abut the ends of extensions 16 by O-ring seals 23 or the like.

Each housing section 10 and 11, FIGURE 2, is provided upon its upper side with an upstanding integral boss 24 having a preferably conically tapered braking fluid inlet passage 25, leading to a restricted passage 26, opening into the adjacent chamber 17 near the inner end thereof and at the upper side of the same. The bosses 24 have screw-threaded openings 27 at their tops for the reception of suitable fittings, carried by lines leading from the conventional emergency relay valve to be mentioned hereinafter. Small inclined vacuum assist ports 28 formed through the wall structure of the housing sections serve to place the passages 26 in direct communication with the interior air chamber formed between the opposed tapered housing sections. The function of the ports 28 during the operation of the valve device will be described during discussion of the general operation of the system.

A reciprocatory diaphragm connecting and valve element actuator rod 29 is slidably mounted within a central bore 30 of separator plate 14 and sealed therein by an O-ring seal 31. Reduced extensions 32 on the opposite ends of rod 29 have similar sliding and guided engagement through openings 33 of walls 18, and are sealed within such openings by additional O-ring seals 34, as shown in the drawings. The extremities of rod extensions 32 carry compressible rubber-like preferably tapered valve elements 35, suitably secured thereto and adapted upon axial shifting of the rod 29 to engage and seal against the mouths of the tubular seats 22. Compressible coil springs 36 surround the tubular seats 22 and have corresponding ends bearing upon the heads 19. The other ends of these springs bear against the valve elements 35 and serve to maintain the same, with the rod 29 in the neutral position shown in FIGURE 2, where the outlet passages afforded by the bores 21 are all open as indicated by the arrows in FIGURE 3.

Arranged upon opposite sides of the separator plate 14 and within the chambers defined by this plate with the two walls 12 are resilient diaphragms 37, preferably formed of sturdy elastic material such as rubber or rubber-like material or the like. The peripheral portions 38 of these diaphragms are tightly clamped between the plate 14 and flanges 13. The diaphragms have central hub portions 39 engaging over tapered sections 40 of the rod 29 and having a snug fit thereon and secured in place against shoulders of the rod 29 by flat washers 41 and snap rings 42 or the like. Fluid tight chambers 43 are thus formed between the plate 14 and diaphragms 37 and such chambers are filled with oil or like liquid during manufacturing of the device. A small orifice 44 formed through the separator plate 14 places the two chambers 43 in communication and allows the oil to have restricted flow from one chamber to the other to provide a retarding or dashpot effect upon the diaphragms and actuator rod 29 during the operation of the valve, thereby providing a time delay factor in the operation to compensate for unequal adjustment of the brake shoe linkages.

Contact springs 45 formed of brass or the like are suitably anchored to the diaphragm hubs 39, thereby insulating the contact springs from the metallic parts of the structure. These contact springs 45 project generally radially of the rod 29 and parallel to the conically tapered diaphragms and spaced from the latter within the main chamber of the valve housing. Coacting terminal screws 46 mounted within suitable insulating bushings 47 are secured within openings of the walls 12, near and radially outwardly of the extensions 16, and these terminal screws are set at right angles to the walls 12 and have interior heads 48 adapted to be engaged by the contact springs 45 when the latter are shifted due to axial movements of the rod 29 under influence of the diaphragms 37 and associated elements and due to pressure changes in the system caused by leakage.

The usual stop light electrical cable 49 from the tractor leads to and is electrically connected at 50 with conventional stop lights 51, FIGURE 3. Wires 52 and 53 connected with one pair of the terminal screws 46 are connected at 47' with the cable 49. Additional wires 54 and 55 connected with the other pair of terminal screws 46 are connected at 56 with signal light means 57, mounted adjacent the driver's compartment on the tractor to indicate the presence or absence of leakage in the fluid brake system. The wires 54 and 55 are also connected electrically at 58. As should be obvious, when the valve device is in the neutral position, FIGURES 2 and 3, no contact is established between the springs 45 and screws 46 and the normal application of the brakes will serve only to energize the stop lights 51 through the cable 49. When there is leakage in the fluid brake system at any point, the actuator rod 29 and associated elements will shift axially in one direction or the other to prevent the loss of air and one pair of spring contacts 45 will bridge a pair of the terminal screws 46 as depicted in FIGURE 4 to complete a circuit with the telltale signal lights 57 to notify the driver of the brake system leakage. While the concept of such a signal light system is not broadly new in the art, the particular signal light system and circuit making and breaking means constituting a part of the present valve device is highly compact, sturdy and substantially foolproof, requiring no adjustment and maintenance save the occasional replacement of a light bulb. The spring contacts 45 are fully enclosed and protected within the dry chamber of the housing and it is virtually impossible for the signal light circuit to fail to operate properly upon axial displacement of the rod 29.

FIGURE 1 of the drawings shows the fluid operated brake system diagrammatically in its entirety. The invention safety valve device is shown in its entirety in FIGURE 1 at 59. The wheel brake actuators are indicated at 60, connected with the outlet passages 21 by means of suitable lines 61. The numeral 62 designates the usual compressed air reservoir tank supplied by a suitable line 63. An emergency supply line 64 leads to an emergency relay valve 65 of a conventional character, connected with the reservoir tank 62, and having outlet lines 66 and 67 leading to and connected with the inlet openings 27 of the valve device to supply the latter with the fluid or air that operates the brake system.

The operation of the system and the safety valve device of the invention is as follows:

Under normal operating conditions, compressed air from the reservoir tank and from the relay valve 65 is fed through both lines 66 and 67 to the safety valve device 59. That is to say, the compressed air enters the valve device at equal pressure through both of the tapered passages 25 and passes therefrom to the chambers 17 and then outwardly through the tubular valve seats 22 to the passages 21 and then to the line 61 which lead to the brake mechanism actuators 60. So long as the system is operating normally and no leak or failure occurs in the diaphragms of the actuators 60, or in any of the lines 61, the diaphragms 37 are subjected to equal or balanced pressure on the outer sides thereof in the main air chamber defined by the body portions 12, and the springs 36 together with this balanced pressure hold the rod 29 in the neutral position, FIGURES 2 and 3, and the two valve elements 35 remain unseated, as shown.

When a leak occurs in the system, in any of the lines 61 or in a diaphragm of one of the actuators 60, for example, the air pressure in one of the chambers 17 is suddenly reduced while normal pressure is maintained in the other chamber 17 and the passages communicating therewith. This condition is illustrated in FIGURE 4 of the drawings. The net result is that unbalanced pressures on the outer sides of the diaphragms 37 are created. In FIGURE 4, normal air pressure is reacting upon the left-hand diaphragm tending to push it with the rod 29 to the right for seating the right-hand valve element 35, as shown. Additionally, FIGURES 2 and 4, and prior to the actual seating or closing of the right-hand valve element 35, the incoming air rushing through the passages 25 and 26 and into the right-hand chamber 17 and rushing therefrom due to the leak in the system, causes air from the right-hand portion of the main chamber defined by body portions 12 to be drawn through the adjacent port 28 and this creates a partial vacuum in the main chamber tending to pull the right-hand diaphragm 37 to the right or in the direction to seat the right-hand valve element 35 as shown in FIGURE 4. In other words, this partial vacuum acts upon the right-hand diaphragm and aids in pulling it to the right in FIGURE 4, while the left-hand diaphragm is being pushed to the right by normal positive pressure in the left-hand portion of the main air chamber. This combined action renders the assembly of the two diaphragms 37 and the valve element actuator rod 29 quite sensitive so that the latter will respond to leaks on either side of the safety valve device 59 in the system shown in FIGURE 1.

However, in conjunction with this sensitive or quick acting diaphragm action, the device has a built-in retarding or time delay feature which modifies the operation of the safety valve at all times and allows the same to respond only to actual leaks in the brake system and not to fictitious leaks caused by unequal brake shoe linkage adjustment. This time delay feature is afforded whenever the two diaphragms tend to move with the rod 29 in either direction. The oil or like fluid in the chambers 43, in response to movement of the diaphragms 37 in either direction must pass thrugh small orifice 44, and this causes a dashpot or retarding effect on the diaphragms and slows down their movement with the rod 29 and valve elements 35 toward one or the other of the valve seats 22. This is important for enabling the safety valve device not to respond to a fictitious leak caused by unequal brake shoe linkage adjustment, when there is a brief interval of time required to build up equal air pressure to the respective brake shoes which are not equally adjusted, and during which interval it is desired not to have the safety valve device actuated in response to a leak which is not, in fact, a leak at all. The time delay factor produced by the oil in the chambers 43 flowing through the orifice 44 is sufficient to enable the valve device not to operate until the air pressure is equalized in that portion of the system or upon that axle of the vehicle where the brake shoes are unequally adjusted.

In the case of a true leak, however, even a very small leak which is continuous rather than momentary, the combined action of positive pressure on one diaphragm and partial vacuum on the other diaphragm still renders the action of the valve device quite sensitive and quick acting for seating one of the valve elements 35 to shut off the flow of air to the portion of the system which is leaking. Therefore, the mentioned time delay or retarding feature coacts with the sensitive differential pressure actuation of the valve device to enable the latter to sense and respond quickly to actual leaks and not to respond to fictitious leaks or mere momentary symptons of leaks which are not leaks at all.

Whenever the rod 29 and associated elements is moved in either axial direction to seat one of the valve elements 35, FIGURE 4, one pair of contact springs 45 engages and bridges the adjacent pair of terminal screws 46 to complete a circuit through the signal light means 57, to indicate to the truck driver that the brake system is leaking and the vehicle should be brought to a stop. The spring contacts 45 of each pair are of course electrically connected so that they may electrically bridge the adjacent pair of terminal screws. The circuit to the signal light means 57 is completed whenever the rod 29 is shifted sufficiently far in either direction as illustrated, for example, in FIGURE 4.

When the valve device is thus operated to close off the leaking portion of the brake system, the remaining portion thereof remains uneffected and fully operable to cause braking of the vehicle and enabling the vehicle to be stopped prior to the loss of any appreciable amount of air pressure in the system.

If preferred, the diaphragms 37 may be formed of rippled sheet metal or the like instead of rubber-like material as illustrated. In such case, the contact springs 45 must of course be insulated from the metallic diaphragms.

When the leak in the system is corrected and equalized pressure is restored upon the opposite sides of the main air chamber and outwardly of the two diaphragms, the rod 29 and diaphragms will center themselves automatically at the neutral position shown in FIGURE 2, with both valve elements 35 unseated so that the pressurized braking fluid may pass freely to the various supply lines 61 of the system shown in FIGURE 1.

The resiliency or spring action of the diaphragms 37 also aids the springs 36 in returning the rod 29 to the neutral position and again helps to render the valve device more sensitive and responsive during operation.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A safety valve means for a fluid pressure brake system comprising a companion pair of opposed housing sections including opposed wall portions defining therebetween a main chamber, a separator plate disposed between said housing sections in abutting relation thereto and having a small orifice formed therethrough and dividing said main chamber, each housing section having an inlet passage means and a small port interconnecting said main chamber and the inlet passage means, each housing section having outlet passage means including a part forming a valve seat, a reciprocatory actuator rod spanning said main chamber and having end portions extending into the outlet passage means in aligned relation to the valve seats, said housing sections and separator plate having aligned openings slidably receiving said actuator rod, valve elements secured to the opposite ends of said rod within the outlet passage means and shiftable therewith toward engagement with the valve seats, a pair of resilient diaphragms on opposite sides of the separator plate and within said divided main chamber and having marginal portions thereof clamped between the abutting housing sections and separator plate and having central hub portions secured to said rod upon opposite sides of the separator plate, said diaphragms forming with the separator plate and said orifice a closed chamber, and a quantity of fluid substantially filling the closed chamber and adapted to flow through said orifice during movement of said rod in either direction to retard the movement of the rod and said valve elements.

2. The invention as defined by claim 1, and wherein said outlet passage means of each housing section includes a chamber having said valve seats disposed therein, and a coil spring disposed within each chamber in surrounding relation to the valve seat and bearing against the adjacent valve element to normally maintain the latter unseated and for maintaining said rod and said diaphragms in a neutral position relative to the valve seats.

3. The invention as defined by claim 1, and wherein said valve elements and diaphragms are formed of elastomeric material.

4. The invention as defined by claim 1, and a pair of generally radially extending electrically connected spring contact elements on the hub portions of said diaphragms within the divided main chamber and movable with said rod and diaphragms, a pair of terminal elements on each housing section including parts projecting into the main chamber in the path of movement of said contact springs, and signal light circuit means connected with the terminal elements and energized by engagement of either pair of spring contacts with the adjacent pair of said terminal elements.

5. A safety valve device for an automotive vehicle air brake system comprising a housing having air inlet passages, a main air chamber and reduced ports interconnecting said chamber and passages, said housing having second chambers on opposite sides of the main chamber and separated therefrom and communicating with said inlet passages, head elements covering the outer ends of said second passages and including tubular valve seats projecting into the second chambers and outlet passages intersecting and leading from the bores of the tubular valve seats, said inlet and outlet passages adapted for connection respectively with air inlet and air distribution lines of the brake system, a separator plate for said housing dividing said main chamber into two substantially equally sized portions and having a through orifice, a reciprocatory actuator rod extending through said main chamber in axial alignment with the valve seat and having end portions extending into the second chambers, the length of said rod being less than the distance between said valve seats, said housing and separator plate having aligned openings receiving and supporting said rod movably, seal means in said openings having sealing engagement with the rod, valve elements carried by opposite ends of the rod within the second chambers and engageable with the valve seats upon reciprocation of the rod axially in either direction, and elastic diaphragms secured to said rod upon opposite sides of the separator plate and having marginal portions anchored to the housing and separator plate remotely of the rod and defining therebetween and with the separator plate a closed chamber within the main chamber adapted to be filled with fluid and wherein the fluid may pass through said orifice to retard the rod during axial movement thereof.

6. The invention as defined by claim 5, and actuator rod centering springs disposed within the second chambers surrounding the tubular valve seats and having corresponding ends bearing upon the head elements and valve elements.

7. The invention as defined by claim 5, and electrical contact means carried by the diaphragms outwardly thereof and within the main chamber, and coacting electrical terminal elements secured to said housing in the path of travel of the contact means and engageable thereby during movement of said rod and diaphragms axially, said terminal elements adapted for connection in a signal light circuit of said vehicle.

8. In a fluid pressure operated brake system including independent wheel brakes and a fluid pressure actuator for each wheel brake, a safety valve device for said system adapted for connection with supply lines feeding said actuators and also adapted for connection with delivery lines leading to an emergency relay valve on a fluid pressure reservoir tank, said safety valve device comprising a two part housing defining a conically tapered substantially closed main chamber, a separator plate dividing said chamber and having a through orifice and abutting the parts of said two part housing, screw means detachably interconnecting the two part housing and separator plate, extension means on the two part housing having fluid inlet passages and fluid outlet chambers communicating with the inlet passages, said two part housing having reduced internal ports interconnecting said inlet passages and divided main chamber and adapted to draw a partial vacuum in either side of the main chamber during the flow of fluid into and through the inlet passages, heads detachably secured to said extension means and covering the outlet chambers thereof and having outlet passages and tubular valve seats projecting into the outlet chambers, said two part housing and separator plate having openings formed therethrough in alignment with the valve seats, the openings of the two part housing communicating with the main chamber and outlet chambers, an actuator rod movably mounted within said openings and spanning the main chamber and extending into the outlet chambers, compressible valve elements carried by the ends of said rod within the outlet chambers and engageable with the valve seats to block said outlet passages of said heads, springs within the outlet chambers engaging the valve seats and serving to maintain the actuator rod in a neutral position relative to the valve seats, elastic diaphragms within the main chamber on opposite sides of the separator plate and secured centrally to said rod and having peripheral edge portions clamped between the two part housing and separator plate and defining with the separator plate and the through orifice thereof a closed fluid filled chamber separate from the main chamber and wholly within the main chamber, and signal light circuit closing means connected with said rod and diaphragms within the main chamber for energizing said circuit upon movement of said rod and diaphragms in either direction axially of the rod and valve seats.

No references cited.